(12) United States Patent
Schaeffer (10) Patent No.: US 6,425,612 B1
(45) Date of Patent: Jul. 30, 2002

(54) GRAVITY OPERATED GATE LATCH

(76) Inventor: Tom Stephens Schaeffer, 948 Sandy Creek Rd., Dale, TX (US) 78616

( * ) Notice: Subject to any disclaimer, the term of this patent is extended or adjusted under 35 U.S.C. 154(b) by 0 days.

(21) Appl. No.: 09/469,855

(22) Filed: Dec. 22, 1999

(51) Int. Cl.[7] .............................................. E05B 15/02
(52) U.S. Cl. .......................... 292/341.17; 292/341.15; 292/238
(58) Field of Search ................. 292/341.15–341.17, 292/300, 304, 45, 201; 49/394, 503

(56) References Cited

U.S. PATENT DOCUMENTS

| | | | | |
|---|---|---|---|---|
| 484,752 A | * | 10/1892 | Hoffman | |
| 1,183,575 A | * | 5/1916 | Longenecker | 292/341.17 |
| 2,693,043 A | * | 11/1954 | Leake | 292/341.15 |
| 4,923,231 A | * | 5/1990 | Bergman et al. | 292/238 |

* cited by examiner

*Primary Examiner*—Anthony Knight
*Assistant Examiner*—Mark Williams
(74) *Attorney, Agent, or Firm*—Rick B. Yeager (57) ABSTRACT

A symmetrical gravity operated gate latch for fastening a two way gate and arranged to be manually released easily from either side of the closed gate to permit swinging movement and opening of the gate in either direction. The gate latch including a means for swinging the free end of the gate shut, thereby securing itself through inertia and gravity. The free end of the gate including a striker bar which passes through the striker slot and through the first of two pivotally mounted flappers. The second flapper is positioned so said flapper may not pivot out of the housing, thereby securing the striker bar between the flappers until one of the flappers is rotated inward to release the striker bar.

13 Claims, 6 Drawing Sheets

GRAVITY OPERATED GATE LATCH

FIELD OF INVENTION

The current design relates to gate latches and more particularly to an improved, reversible, gravity operated gate latch.

DESCRIPTION OF RELATED ART

Functional gate latches are widely known in their prior embodiments. Including: U.S. Pat. No. 4,799,720, to Watson et al., issued on Jan. 24, 1989; U.S. Pat. No. 4,923,231, to Bergman et al., issued on May 8, 1990; and U.S. Pat. No. 4,302,908 to Parker issued on Apr. 16, 1979. Many prior gravity operated latch systems include one or two flappers or rings which can be swung pivotally upward and inward, but which is restrained against outward movement so as to contain a striker bar within the flappers or rings.

Prior gravity operated gate latches are considered to have a number of shortcomings. The general limitations are that a special effort must be made to lock the gate, and that the gate will only open in a single direction if approached from the correct side. In addition, many of the prior systems are rather complicated structurally, and consequently are relatively expensive to manufacture. Other latches can be opened from either side, but are not self-locking when swung shut. Still other latches, although simplified and self-locking do not provide an adjustable striker bar. If the gate and gate latch are exposed to extreme wind or abuse by animals or the like, the gate may sag causing the striker bar not to engage the striker slot rendering the latch and gate useless.

It is an objective of the current design to provide an improved gravity operated gate latch that will permit a gate to be swung shut from either direction and will be self securing.

It is a further objective of the current design to permit the gate to be released easily in either direction.

It is the further objective of the current design to provide a gate latch that can be retrofitted into a pre-existing chain link fence post or an existing wooden fence post.

It is the further objective of the current design to provide a gate latch which has no external protrusions on which the user or an enclosed animal may injure themselves on.

It is a further objective of the current design to provide a mechanism that can be incorporated in rugged applications such as livestock pens.

It is a further objective of the current design to provide a gate latch with a striker bar height adjustment capability to compensate for changes in the position of the free end of the gate relative to the stationary end.

SUMMARY OF INVENTION

The invention consists of a housing assembly attached to, or incorporated into the stationary portion of a gate. In the preferred embodiment, this housing is incorporated in the post and the housing contains the striker bar when the gate is in a closed position.

The housing assembly contains two flapper pins positioned part way up and just inside the inner edge of the housing. Mounted on these pins are a pair of offset, pivotally mounted, vertically hanging flappers. These flappers may be swung in and up, but may not be swung out of the housing. The flappers are cut to a length to prevent the striker bar from releasing underneath, but are mounted high enough to allow the flappers to fall back into position after the striker bar has passed, thus locking the bar in the gate closed position. They are also hung in such a way that they can be manually pivoted inwards to allow for the intentional release of the striker bar. The flappers are attached to the pins in an offset fashion in order to place their sides nearly flush with the inside of the housing. This offset provides additional strength and it shortens the radius of the swing distance of the end of the flapper thereby increasing consistency of the flapper falling into place and locking the striker.

Near the bottom edge of the flappers, a striker slot is cut across the entire front and a portion of the sides of the housing. The striker slot is tall and deep enough for the striker bar to pass through without contacting the housing assembly. The striker slot is symmetric to allow the striker bar to enter and exit equally from either side.

The invention consists of a striker bar attached to the free end of a swinging gate. The striker bar passes through the housing assembly and is allowed to pass inside by way of the striker slot. Upon entering the striker slot it contacts the first of two flappers which is pushed up and in to allow passage of the striker bar. Upon passing the first flapper, the first flapper falls back down into position and is stopped by contacting the inside of the housing behind it. The striker bar then contacts the second flapper which is positioned to prevent passage by butting against the inside of the housing. Once the flapper bounces back, it again contacts the first flapper which, like the second flapper, will not pivot outward, thereby locking the striker bar in between the two flappers and securing the gate in the closed position.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENT

Figure 1:
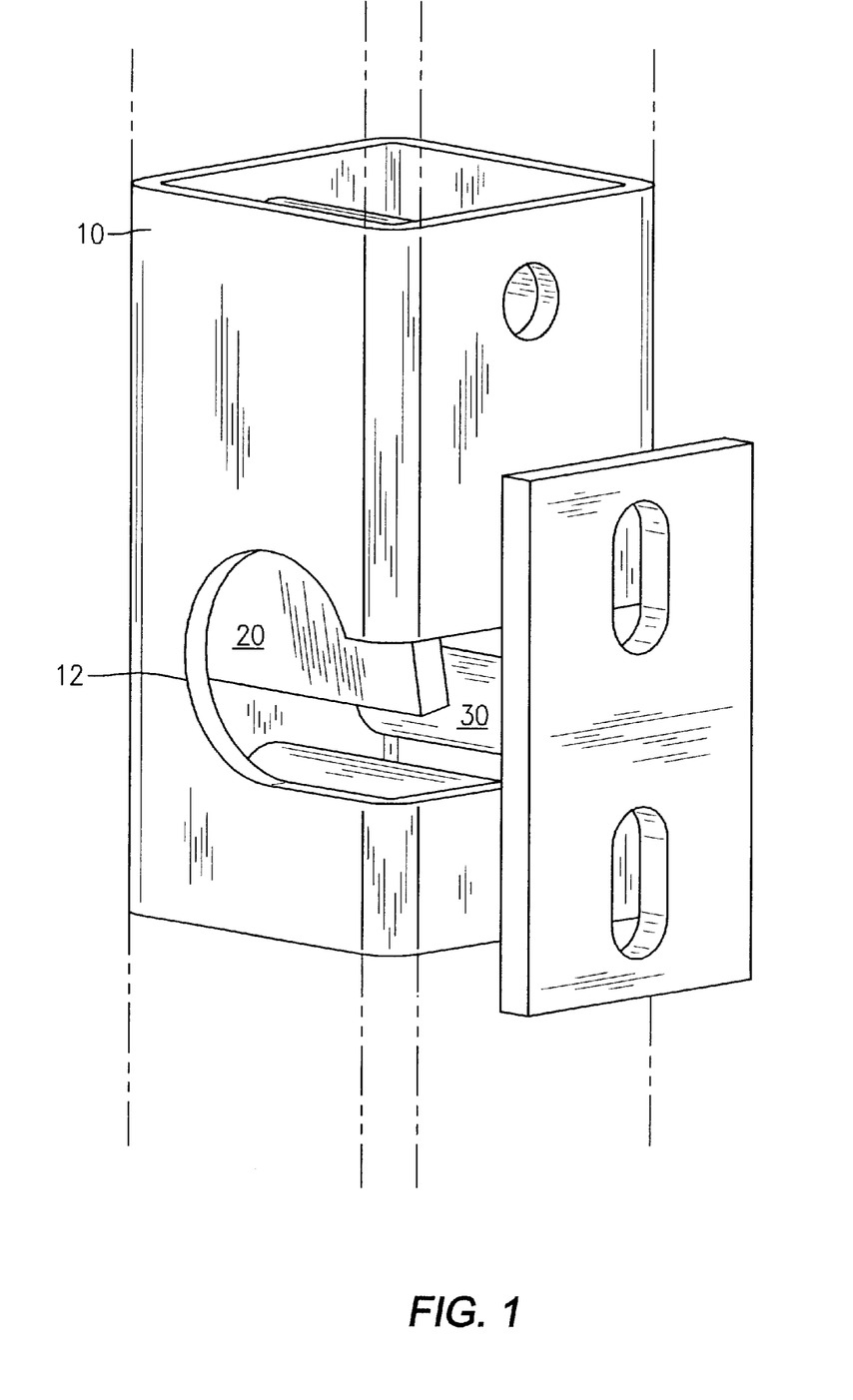
FIG. 1 is a perspective view of the latch mechanism and the striker bar.

Referring now to FIG. 1, which is a perspective view of the latch mechanism, upon passing into the housing 10 assembly by way of the striker slot 12, the striker bar 30 contacts the first flapper 20. The first flapper rotates, moving in and up. Upon passage of the striker bar past the edge of the first flapper, the first flapper falls back to a vertically hanging position. The striker bar then continues forward until it contacts a second flapper on the other side of the housing. The second flapper is positioned to prevent passage by butting against the inside of the housing with both flappers being prevented from outward movement, the striker bar is then secured inside the latching mechanism.

Figure 2A:
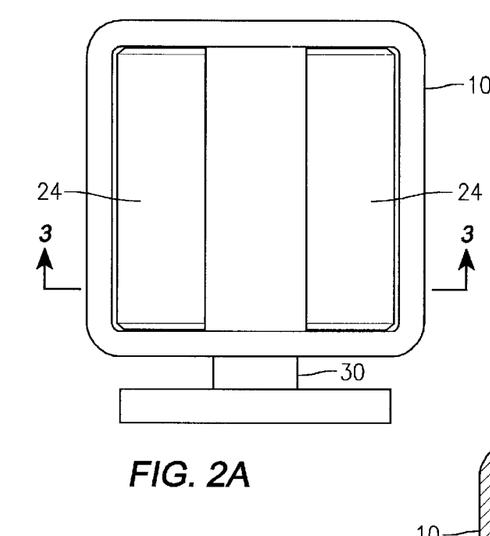
FIG. 2A is a cross sectional top view of the preferred embodiment.
Figure 2B:
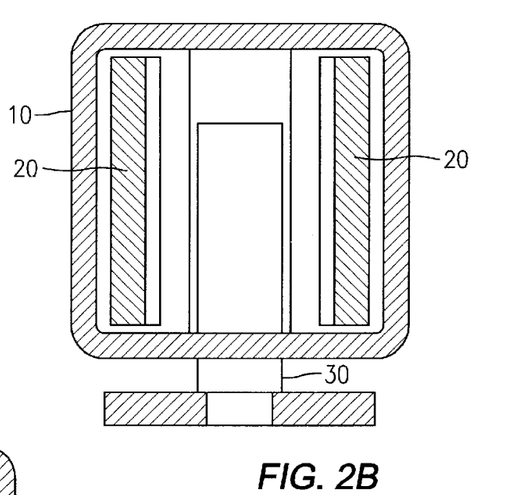
FIG. 2B is a cut away view below the pins.
Figure 2C:
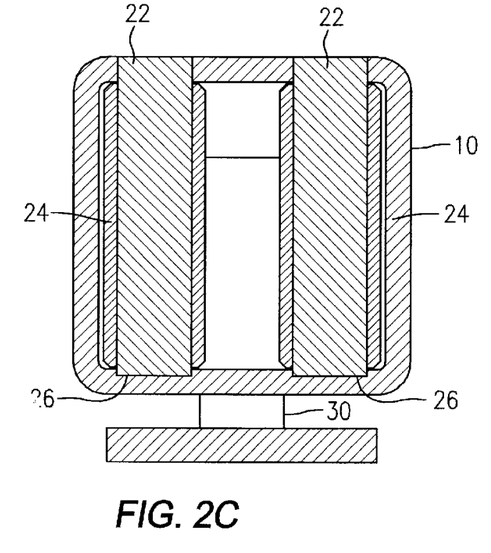
FIG. 2C is a cut away view above the pins.
Figure 3:
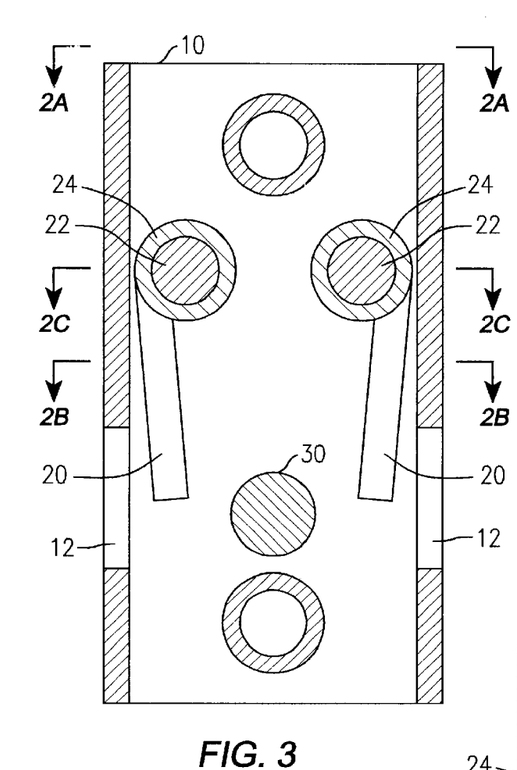
FIG. 3 is a front view of the preferred embodiment in the closed/locked position
Figure 4:
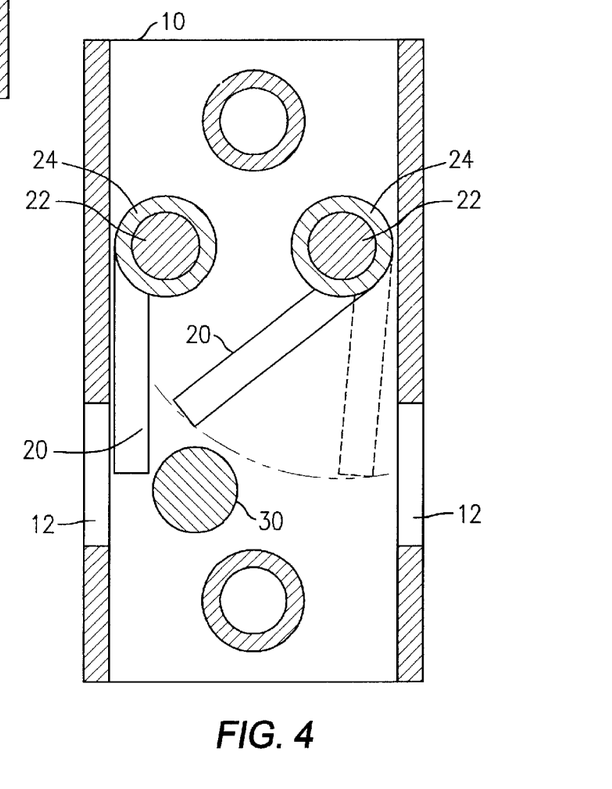
FIG. 4 is a front view of the preferred embodiment in an open position
Figure 5:
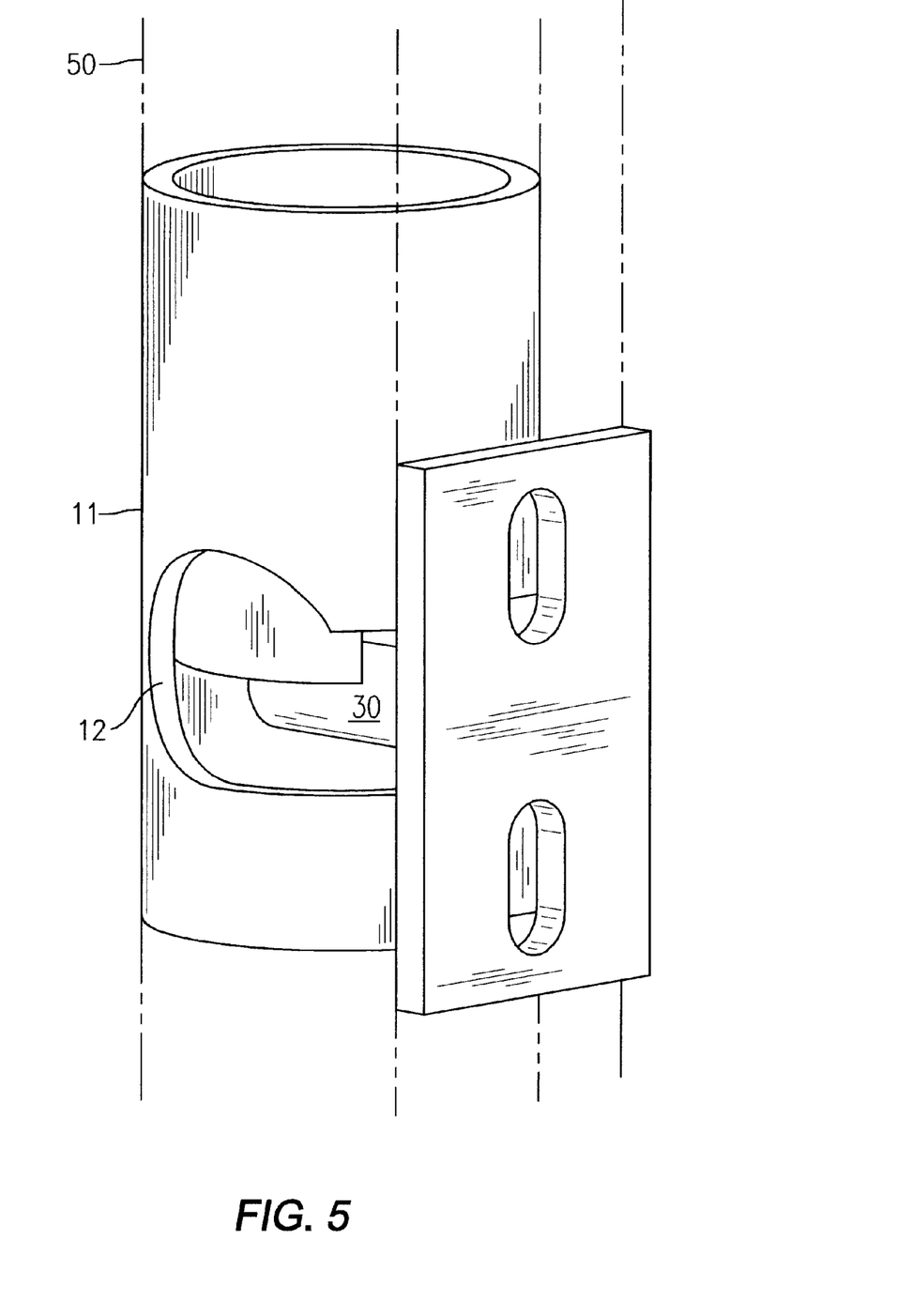
FIG. 5 is a detail of the striker slot for an alternate embodiment in a round housing.
Figure 8:
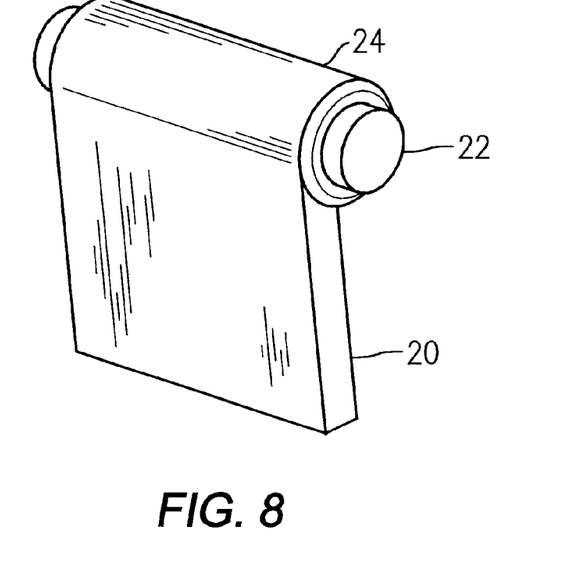
FIG. 8 is a detail of the flapper assembly including the pins and sleeve.

Referring now to FIG. 2A. The preferred embodiment of the current latch invention is a square tube 10 of standard wall thickness of 178 inches thick, and 2.5 inches wide. Referring now to FIG. 3. The body of the housing 10 is generally about 4.75 inches from top to bottom. The height may be altered to fit the application. The lock includes a length of steel tubing which functions as the flapper sleeves 24 with a preferred outside diameter of 0.75 inch, an inside diameter of approximately 0.5 inch. The tubing is preferably extruded to insure that the parts are uniform. This tube is cut to fit within the inside dimensions of the square tubing without rubbing or binding. Now referring to FIG. 8, a flapper 20 is preferably constructed from a flat steel plate approximately 0.25 inch thick by approximately 2 inch wide and 1.33 inch long. This flapper is preferably welded to the outside of the flapper sleeve 24 so that about 0.05 inch of the flapper protrudes past the sleeve. The flat steel is then welded to the sleeve so that its bottom side and the bottom of the sleeve are on the same plane. The final length from the center of the flapper sleeve to the bottom of the flapper is approximately 1.66 in. This assembly may be cast as a single unit.

Referring again to FIG. 3, the flappers are mounted to the housing by approximately 0.5 inch diameter steel rods which function as flapper pins 22 to permit rotation of the sleeves and flappers. The pins preferably extend from a hole in the rear of the housing to a hole drilled only to form a depression or flapper pin recess 26 in the inside of the front of the housing Alternately, the hole may be drilled entirely through the housing so that the pins may be press-fit or welded into place. The pins are mounted inside the flapper sleeves 24 to allow the flappers 20 to swing freely. When the flappers are mounted to sit flush with the housing 10, the design was found to possess the maximum strength. By welding the flapper 20 to its sleeve 24 in an offset fashion, the pivot point permits a decreased swing distance and flapper 20 length. There is a preferably oblong hole or striker slot 12 in the sides and front of the housing 10 which is approximately 1.5 inch tall. The slot allows the striker 30 to pass. This slot 12 also allows the user to release the flapper 20 safely. There is a preferably oblong extension to the hole in the side of the housing which is approximately 1.5 inches tall and which allows access by the thumb or finger of the user to depress the flapper inward, thereby releasing the striker bar. The shape of the slot opening is not critical so long as it provides enough space for a gloved hand to release the flapper 20 without pinching.

ALTERNATE EMBODIMENT—CAST FLAPPER DESIGN

Figure 9:
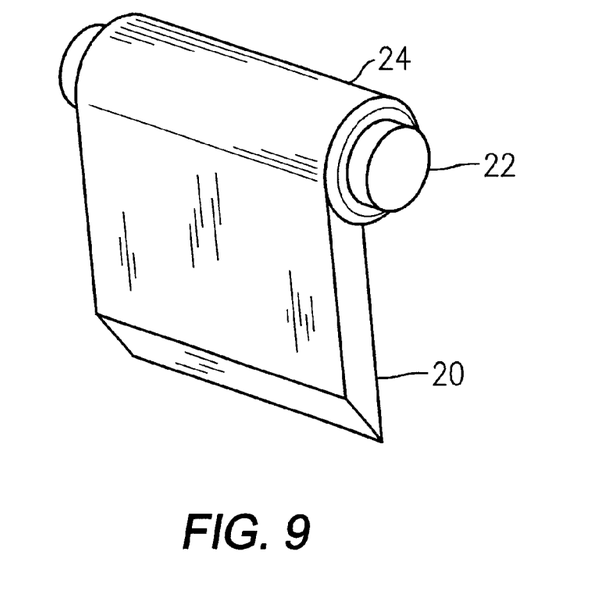
FIG. 9 is a detail of the flapper assembly in an alternate tapered embodiment.

Referring now to FIG. 9, using a casting method of production, the flapper 20 design is altered to provide a greater level of strength. The bottom is cut at a 45 degree angle with the resulting face directed outwards with respect to the housing. This angle provides the striker bar 30 with a greater target area, thus reducing the likelihood of failure due to a change in striker bar 30 alignment. This design also allows the flapper 20 to be longer for increased strength.

ALTERNATE EMBODIMENT—ROUND TUBE

Figure 6:
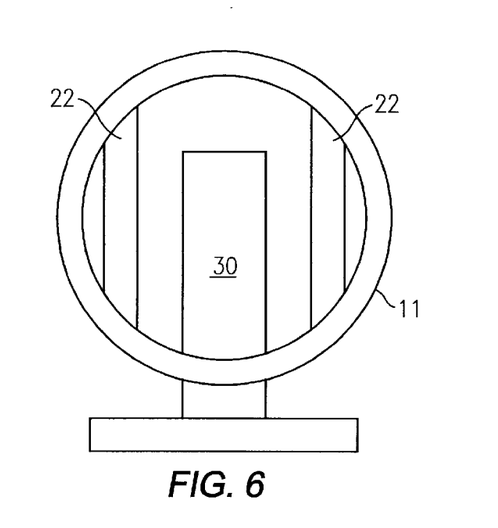
FIG. 6 is a top view of an alternate embodiment in a round housing.
Figure 7:
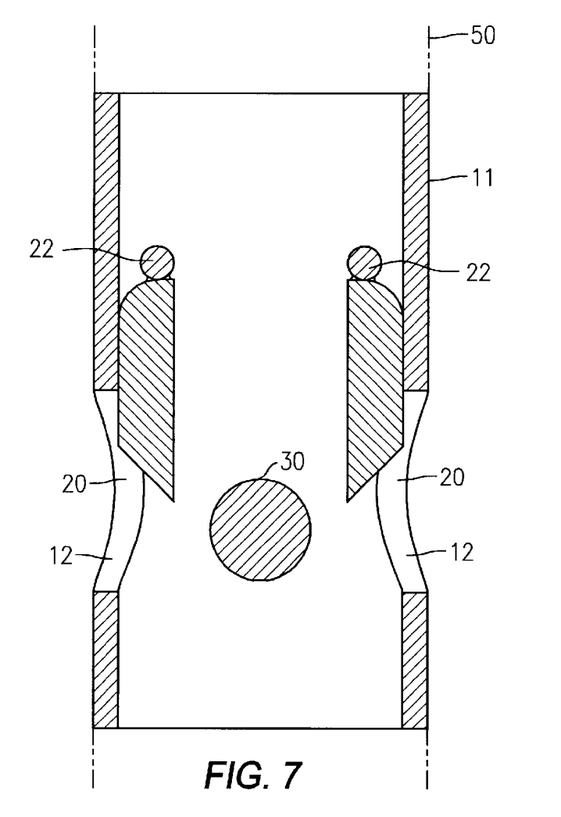
FIG. 7 is a front view of an alternate embodiment in the closed position.

Now referring to FIGS. 6 and 7, an alternate embodiment of the latch release allows it to be manufactured into a round pipe housing 11 as opposed to the square tube housing. The latch may be manufactured directly into a standard size chain link fence post 50 with an outer diameter of approximately 2.36 inches or into any other relatively large pipe. Because of space constrictions, the flapper pins 22 are preferably 0.25 inch shorter than in the square embodiment. The striker bar 30 diameter is preferably reduced to 0.5 inch in order to clear the reduced sizes of the striker slot 12 and flapper 20. This embodiment is economical for lighter applications such as security gates, swimming pool enclosures, and standard chain link fences. The outside of the flappers may be arced to match the inside diameter of the housing to permit the flappers to be flush with the housing at rest. The top of the flappers are arced to permit the flappers to rotate upwards without interference from the housing.

ALTERNATE EMBODIMENT—REMOTE ENTRY

The original embodiment is adaptable to permit remote entry. In this embodiment the latch is installed in a lengthened piece of pipe. An electric solenoid is mounted inside the housing above a flapper. The solenoid incorporates a thin, retractable rod or wire which is attached to the inside of the flapper. Upon activation of the solenoid, the rod retracts, thereby raising the wire or rod and causing the flapper to rotate upwards, thus releasing the striker remotely. The solenoid may be equipped with a timer to keep the gate unlocked for a preprogrammed amount of time.

ALTERNATE EMBODIMENT—PREEXISTING CHAIN LINK FENCE

In this embodiment a locking mechanism is adapted to fit a preexisting chain link fence. The top and bottom portions of an elongated lock are preferably tapered a few thousandths of an inch to allow the lock to fit snugly with a gate post which is already cemented into the ground. Once placed in the original post, the seizes into place, thereby creating a solid structure with an integral latch.

ALTERNATE EMBODIMENT—POLYMER CONSTRUCTION MATERIAL

The current design may be manufactured entirely from polymer, or from a combination of steel and plastic. The entire flapper unit 20 may be molded from plastic and snapped into place to reduce assembly labor. The advantages of the polymer include its resistance to corrosion. Polymers tend to resist saltwater and are practical for applications near saltwater or at locations where atmospheric pressure would cause corrosion of standard ferrous metals. The lubricity of polymers also reduces the need for additional lubrication.

ALTERNATE EMBODIMENT—DEAD BOLT LOCK FOR LATCH

The latch is easily adaptable to retrofit with a standard deadbolt. The deadbolt is mounted in the side of the lock body. With the striker locked between the flappers, a key would is inserted into the deadbolt and turned, thereby causing the bar in the deadbolt to move down between the flappers, and restricting the flapper movement and locking the assembly. A locking gatelock is approximately one inch longer than a latch without a key lock.

ALTERNATE EMBODIMENT—PAD LOCK FOR LATCH

The current design is adaptable to employ a standard pad lock for the purpose of locking the gate shut. A hole is be drilled in either of the flappers so that the pad lock may be locked through this hole. The size of the lock prevents the flappers from swinging in thus locking the striker bar inside the latch. Holes may be drilled in both flappers to permit locking from either or both directions.

ALTERNATE EMBODIMENT—POST WITH INTEGRAL LATCH

In this embodiment, the latch mechanism is incoporated in a full length post. The post is set so that the mechanism is oriented with the slot adjacent to the gate. The striker bar is mounted on the gate at the proper height after the post installation.

ALTERNATE EMBODIMENT—RECESSED WOOD POST MOUNTING

In this embodiment, a large wooden fence post, typically 5 inches or more in diameter. is recessed by approximately 4.75 inches in height and 2.5 inches deep. The housing includes mounting holes so that the assembly may be lag bolted to the post.

What is claimed is:

1. A gate latch comprising:
a striker bar integral to the free end of the swinging gate;
a keeper assembly comprising
 a rectangular housing having a front wall which faces the gate, a back wall, a first side wall, and a second side wall,
 the housing having a striker slot through the front wall and through a portion of the first side wall and second side wall, the slot having a height and depth sufficient to permit the striker bar to swing through the slot,
 a first flapper being pivotally mounted within the housing in proximity to the first side wall so that the flapper has
  a first normal hanging vertical position between the first side wall and the striker bar when the striker bar is in its closed position,
  a second restrained position, where the first flapper pivots slightly outward with respect to the center of the housing and obstructs at least a portion of the striker slot thereby restricting the striker bar from moving past the first flapper, and
  a third inward pivoted position where the first flapper is pivoted upward sufficiently to permit the striker bar to pass underneath the flapper and through the slot;
 a second flapper being pivotally mounted within the housing in proximity to the second side wall so that the flapper has
  a first normal hanging vertical position between the second side wall and the striker bar when the striker bar is in its closed position,
  a second restrained position, where the second flapper pivots slightly outward with respect to the center of the housing and obstructs at least a portion of the striker slot thereby restricting the striker bar from moving past the second flapper, and
  a third inward pivoted position where the second flapper is pivoted upward sufficiently to permit the striker bar to pass underneath the flapper and through the slot;
such that when the gate is swung shut, the striker bar enters the striker slot and forces the first flapper from its first normally hanging position to its third upwardly pivoted position so that the striker bar may pass underneath the first flapper, allowing the first flapper to then return to its first position, the striker bar continuing its motion until it contacts the second flapper which is hanging in its first position, the second flapper then being forced to pivot slightly outward to its second position which prevents the striker bar from passing through the striker slot, the striker bar then being confined between the two flappers so that the gate is secured in a closed position.

2. The gate latch of claim 1 wherein
a striker bar is adjustably mounted to the free end of the gate such that the height of the striker bar may be adjusted.

3. The gate latch of claim 1 wherein
the first flapper is integral to a first sleeve, and the first sleeve is mounted on a first pin integral to the housing thereby permitting the first flapper to pivot on the first flapper pin; and
the second flapper is integral to a second sleeve, and the second sleeve is mounted on a second pin integral to the housing thereby permitting the second flapper to pivot on the second flapper pin.

4. The gate latch of claim 1 wherein
the striker slot is extended vertically over a portion of the housing adjacent to the first flapper to permit an extended means such as a finger to pivot the first flapper to its third inward pivoted position.

5. The gate latch of claim 1 wherein
a solenoid is contained within the housing such that when the solenoid is activated a first flapper pivot means forces the first flapper to pivot to its third inward pivoted position, thereby releasing the striker bar from the keeper assembly.

6. The gate latch of claim 1 wherein
mounting holes are provided in the back wall to permit bolting the assembly to a post.

7. A gate latch comprising:
a striker bar integral to the free end of the swinging gate, the striker bar having a diameter of approximately 0.75 inches; and
a keeper assembly comprising
 a rectangular housing having a front wall which faces the gate, a back wall, a first side wall, and a second side wall,
 the housing having a striker slot with a height of approximately 1 inch through the front wall and through a portion of the first side wall and second side wall, the slot having a depth sufficient to permit the striker bar to swing through the slot,
 a first flapper being pivotally mounted within the housing in proximity to the first side wall so that the flapper has
  a first normal hanging vertical position between the first side wall and the striker bar when the striker bar is in its closed position,
  a second restrained position, where the first flapper pivots slightly outward with respect to the center of the housing and obstructs at least a portion of the striker slot thereby restricting the striker bar from moving past the first flapper, and
  a third inward pivoted position where the first flapper is pivoted upward sufficiently to permit the striker bar to pass underneath the flapper and through the slot;

a second flapper being pivotally mounted within the housing in proximity to the second side wall so that the flapper has
  a first normal hanging vertical position between the second side wall and the striker bar when the striker bar is in its closed position,
  a second restrained position, where the second flapper pivots slightly outward with respect to the center of the housing and obstructs at least a portion of the striker slot thereby restricting the striker bar from moving past the second flapper, and
  a third inward pivoted position where the second flapper is pivoted upward sufficiently to permit the striker bar to pass underneath the flapper and through the slot;

such that when the gate is swung shut, the striker bar enters the striker slot and forces the first flapper from its first normally hanging position to its third upwardly pivoted position so that the striker bar may pass underneath the first flapper, allowing the first flapper to then return to its first position, the striker bar continuing its motion until it contacts the second flapper which is hanging in its first position, the second flapper then being forced to pivot slightly outward to its second position which prevents the striker bar from passing through the striker slot, the striker bar then being confined between the two flappers so that the gate is secured in a closed position.

8. The gate latch of claim 7 wherein
the bottom of the first flapper is cut at approximately a 45 degree angle such that the resulting face is oriented outward with respect to the housing.

9. A gate latch comprising:
a striker bar of diameter approximately 0.5 inch, the bar integral to the free end of the swinging gate;
a keeper assembly comprising
  a cylindrical housing having a front wall segment which faces the gate, a back wall segment, a first side wall segment, and a second side wall segment,
  the housing having a striker slot through the front wall segment and through a portion of the first side wall segment and second side wall segment, the slot having a height of approximately 0.75 inch and depth sufficient to permit the striker bar to swing through the slot,
  a first flapper having a bottom edge cut at approximately a 45 degree angle such that the resulting face is oriented outward with respect to the housing, the flapper having a height of approximately 1.65 inches and being pivotally mounted within the housing in proximity to the first side wall segment so that the flapper has
    a first normal hanging vertical position between the first side wall segment and the striker bar when the striker bar is in its closed position such that the first flapper extends over all but approximately the bottom 0.5 inch of the height of the striker slot, thereby restricting the striker bar from moving past the first flapper, and
    a second inward pivoted position where the first flapper is pivoted upward sufficiently to permit the striker bar to pass underneath the flapper and through the slot;
  a second flapper having a bottom edge cut at approximately a 45 degree angle such that the resulting face is oriented outward with respect to the housing, the flapper having a height of approximately 1.65 inches and being pivotally mounted within the housing in proximity to the second side wall segment so that the flapper has
    a first normal hanging vertical position between the second side wall segment and the striker bar when the striker bar is in its closed position such that the first flapper extends over all but approximately the bottom 0.5 inch of the height of the striker slot, thereby restricting the striker bar from moving past the first flapper, and
    a second inward pivoted position where the first flapper is pivoted upward sufficiently to permit the striker bar to pass underneath the flapper and through the slot;

such that when the gate is swung shut, the striker bar enters the striker slot and forces the first flapper from its first normally hanging position to its second upwardly pivoted position so that the striker bar may pass underneath the first flapper, allowing the first flapper to then return to its first position, the striker bar continuing its motion until it contacts the second flapper which is hanging in its first position which prevents the striker bar from passing through the striker slot, the striker bar then being confined between the two flappers so that the gate is secured in a closed position.

10. The gate latch of claim 9 wherein
the cylindrical housing has a tapered bottom end to facilitate retrofitting the housing into a preexisting fence post.

11. A method of securing a gate, the method comprising the steps of
attaching a striker bar to the free end of a swinging gate;
providing a first and second flapper mechanism entirely within a slotted housing;
swinging the gate and permitting the striker bar to enter the slotted housing;
pivoting the first flapper mechanism inward to permit the striker bar to pass beneath the first flapper mechanism;
dropping the first flapper mechanism to prevent the striker bar from exiting the housing; and
the second flapper being forced to pivot slightly outward to a position which prevents the striker bar from passing through the slot of the slotted housing so that capturing of the striker bar between the first and second flapper mechanisms occurs, thus securing the striker bar in the gate-closed position.

12. A method of installing a gravity gate latch in an existing fence post, the method comprising the steps of:
securing the striker bar to the free end of a swinging gate;
removing a section of the original fence post at a point below the striker bar; and
installing a housing on the fence post, the housing having a front wall, back wall, first side wall, and second side wall, the housing containing two pivotally mounted flappers located entirely within the housing, and a striker slot.

13. A post incorporating a gate latch, the gate latch comprising:
a striker bar integral to the free end of the swinging gate;
a keeper assembly comprising
  a housing having a front wall segment which faces the gate, a back wall segment, a first side wall segment, and a second side wall segment, the housing having a striker slot through the front wall segment and through a portion of the first side wall segment and second side wall segment, the slot having a height and depth sufficient to permit the striker bar to swing through the slot, a first flapper being pivotally mounted within the housing in proximity to the first side wall segment so that the flapper has a first normal hanging vertical position between the first side wall segment and the striker bar when the striker bar is in its closed position, a second restrained position, where the first flapper pivots slightly outward with respect to the center of the housing and obstructs at least a portion of the striker slot thereby restricting the striker bar from moving past the first flapper, and a third inward pivoted position where the first flapper is pivoted upward sufficiently to permit the striker bar to pass underneath the flapper and through the slot;

a second flapper being pivotally mounted within the housing in proximity to the second side wall segment so that the flapper has a first normal hanging vertical position between the second side wall segment and the striker bar is in its closed position, a second restrained position, where the second flapper pivots slightly outward with respect to the center of the housing and obstructs at least a portion of the striker slot thereby restricting the striker bar from moving past the second flapper, and a third inward pivoted position where the second flapper is pivoted upward sufficiently to permit the striker bar to pass underneath the flapper and through the slot;

such that when the gate is swung shut, the striker bar enters the striker slot and forces the first flapper from its first normally hanging position to its third upwardly pivoted position so that the striker bar may pass underneath the first flapper, allowing the first flapper to then return to its first position, the striker bar continuing its motion until it contacts the second flapper which is hanging in its first position, the second flapper then being forced to pivot slightly outward to its second position which prevents the striker bar from passing through the striker slot, the striker bar then being confined between the two flappers so that the gate is secured in a closed position.

* * * * *